US012798070B2

(12) United States Patent
Davis et al.

(10) Patent No.: US 12,798,070 B2
(45) Date of Patent: Nov. 17, 2026

(54) SYSTEMS AND METHODS FOR TOOL LOCATION TRACKING

(71) Applicant: Milwaukee Electric Tool Corporation, Brookfield, WI (US)

(72) Inventors: Anthony M. Davis, Brookfield, WI (US); Johnny Lienau, Glendale, WI (US); Steven M. Smith, Greenfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/690,252

(22) PCT Filed: Sep. 9, 2022

(86) PCT No.: PCT/US2022/043121

§ 371 (c)(1),
(2) Date: Mar. 7, 2024

(87) PCT Pub. No.: WO2023/039201

PCT Pub. Date: Mar. 16, 2023

(65) Prior Publication Data

US 2024/0367303 A1 Nov. 7, 2024

Related U.S. Application Data

(60) Provisional application No. 63/242,742, filed on Sep. 10, 2021.

(51) Int. Cl.
*B25F 5/00* (2006.01)
*G08B 13/22* (2006.01)

(52) U.S. Cl.
CPC ................ *B25F 5/00* (2013.01); *G08B 13/22* (2013.01)

(58) Field of Classification Search
CPC ........... B25F 5/00; G08B 13/22; H04W 92/10
(Continued)

(56) References Cited

U.S. PATENT DOCUMENTS 4,683,542 A * 7/1987 Taniguti ................. G01H 1/003 702/56
5,365,898 A * 11/1994 Mueller .............. F01L 1/34406 123/90.31
(Continued)

FOREIGN PATENT DOCUMENTS

AU 2003234504 A1 * 11/2003 ....... G08B 13/19682
CA 2844035 A1 * 9/2014 ....... A61B 17/07207
(Continued)

*Primary Examiner* — Robert F Long
(74) *Attorney, Agent, or Firm* — Quarles & Brady LLP

(57) ABSTRACT

A power tool and method for efficient location tracking is disclosed. The power tool device (102) for location tracking comprises: a motion sensor (252) configured to sense motion; a transceiver (240) configured to wireless communicate; and an electronic controller (210) including a processor (220) and a memory (230), the electronic controller (210) communicatively coupled to the motion sensor (252) and the transceiver (240), and the electronic controller (210) configured to: identify a first location of the power tool device (102) based on the power tool device (102) exiting a tool tracking area (112); measure, via the motion sensor (252), movement of the power tool device (102) relative to the first location; and transmit, via the transceiver (240), power tool device location data based on the movement measured via the motion sensor (252).

19 Claims, 4 Drawing Sheets

(58) Field of Classification Search
USPC ................ 173/1–2, 29, 46, 50, 90, 171, 213
See application file for complete search history.

(56) References Cited

U.S. PATENT DOCUMENTS 5,817,119 A * 10/1998 Klieman ................ A61B 34/71 606/174
5,886,634 A * 3/1999 Muhme .............. G08B 13/2454 340/5.31
H1821 H * 12/1999 Kosinski ........................... 173/4
6,981,416 B2 * 1/2006 Chen ....................... G01P 15/18 73/514.32
7,205,894 B1 * 4/2007 Savage .............. G08B 13/1427 340/568.1
7,242,319 B2 * 7/2007 Madlener ............... G08C 17/02 340/870.07
7,855,679 B1 * 12/2010 Braiman ................. G01S 19/05 342/357.42
8,505,649 B2 * 8/2013 Scrimshaw ............. B23B 45/02 173/180
9,367,062 B2 * 6/2016 Volpert ..................... B25F 5/00
10,560,322 B1 * 2/2020 Kwan ...................... H04W 4/80
RE48,257 E * 10/2020 Troy .................... G08B 21/182
10,901,505 B1 * 1/2021 Haine ................. G06F 3/04815
11,662,705 B2 * 5/2023 Girt ........................... B25F 5/00 700/175
12,538,095 B2 * 1/2026 Vanghi .................. H04W 4/027
2003/0019844 A1 * 1/2003 Shih ......................... B23H 9/14 219/69.2
2005/0219052 A1 * 10/2005 Chaco ...................... G07C 9/28 340/572.1
2006/0243469 A1 * 11/2006 Webster ............. A47J 43/1037 173/217
2008/0018912 A1 * 1/2008 Schreiber ................ G01S 19/49 342/357.32
2008/0127711 A1 * 6/2008 Farag .................... G01L 25/003 73/1.11
2010/0039317 A1 * 2/2010 Cameron ............... G06Q 10/08 342/357.62
2010/0076474 A1 * 3/2010 Yates ................. A61B 17/3205 606/139
2011/0093110 A1 * 4/2011 Stencel ................... B25B 23/14 700/110
2011/0125138 A1 * 5/2011 Malinouskas .......... A61B 90/90 606/1
2011/0191058 A1 8/2011 Nielsen et al.
2012/0168188 A1 * 7/2012 Eckert ..................... B25B 21/00 173/1
2012/0168189 A1 * 7/2012 Eckert ..................... B25B 21/00 173/1
2012/0174525 A1 * 7/2012 Hinshaw ................... B25C 1/00 52/749.1
2012/0306651 A1 * 12/2012 Hall ................... G08B 13/2454 340/572.1
2013/0109375 A1 * 5/2013 Zeiler ................... G01S 5/0027 455/552.1
2013/0268199 A1 10/2013 Nielsen et al.
2014/0184397 A1 * 7/2014 Volpert ..................... B25F 5/00 340/12.51
2014/0240125 A1 * 8/2014 Burch ...................... B25H 3/02 340/539.13
2015/0277428 A1 * 10/2015 Dackefjord .............. G07C 3/04 700/180
2015/0314434 A1 * 11/2015 Bevins, Jr. ............. B23D 59/00 408/124
2016/0091393 A1 * 3/2016 Liao ...................... G01M 13/00 702/34
2016/0171903 A1 * 6/2016 Grossman ............. G06T 19/006 434/238
2016/0226278 A1 * 8/2016 Wenger ..................... B25F 5/00
2017/0190041 A1 * 7/2017 Dey, IV .................. F16F 9/535
2017/0197305 A1 * 7/2017 Rastegar ................... B25F 3/00
2017/0222382 A1 * 8/2017 Peloquin ................ H01R 27/02
2017/0276572 A1 * 9/2017 Chen ................... G01M 99/005
2017/0353847 A1 * 12/2017 Coulis ........................ B25F 5/00
2018/0071907 A1 * 3/2018 Myhill ...................... B25F 5/00
2018/0107191 A1 * 4/2018 Kubat ................ G05B 19/4186
2018/0354114 A1 * 12/2018 Bantle ..................... B25B 21/02
2019/0059888 A1 * 2/2019 Shelton, IV ....... A61B 17/0684
2019/0160646 A1 * 5/2019 Hoossainy .......... H04W 64/003
2019/0206072 A1 * 7/2019 Geissler ............... H04N 5/2224
2019/0291157 A1 * 9/2019 Fuentes .................... B21D 1/10
2020/0019517 A1 * 1/2020 Chazot .................... G06F 3/167
2020/0047326 A1 * 2/2020 Barbayanni .............. B25H 3/00
2020/0078974 A1 * 3/2020 Skinner ................ G05B 19/182
2020/0223050 A1 * 7/2020 Smith ....................... B25F 5/00
2020/0276682 A1 * 9/2020 Geissler .................... B25F 5/00
2021/0014911 A1 * 1/2021 Patil ...................... H04L 1/1621
2021/0205976 A1 * 7/2021 Matei ....................... G08B 7/06
2021/0328399 A1 * 10/2021 Radtke ...................... B25F 5/02
2021/0347002 A1 * 11/2021 Gallo ................ B23Q 11/0085
2022/0055169 A1 * 2/2022 Kuhlenbeck ......... B23Q 17/006
2022/0166261 A1 * 5/2022 Vetter ....................... B25F 5/00
2022/0185639 A1 * 6/2022 Post ........................ B66C 13/40
2022/0193874 A1 * 6/2022 Ramezanian ........... B25F 5/006
2022/0200299 A1 * 6/2022 Rubens ................... B25F 5/029
2022/0272773 A1 * 8/2022 Coulis ................... H04W 76/10
2022/0314416 A1 * 10/2022 Markwardt ............... B25F 5/00
2022/0407274 A1 * 12/2022 Radtke .................... B25B 27/10
2024/0172299 A1 * 5/2024 Yamaguchi ............... B25F 5/00
2024/0217082 A1 * 7/2024 Abbott .................. B25B 23/147
2024/0367303 A1 * 11/2024 Davis ........................ B25F 5/00
2024/0382280 A1 * 11/2024 Campisano ............ A61B 34/74
2024/0399553 A1 * 12/2024 Davis ...................... H04L 67/12
2024/0422220 A1 * 12/2024 Davis ...................... H04L 67/12
2025/0134523 A1 * 5/2025 Hart ................... A61B 17/1155
2025/0135622 A1 * 5/2025 Davis .................. B25B 23/1425
2025/0186127 A1 * 6/2025 Demanget ............. A61B 17/14
2025/0346144 A1 * 11/2025 Ketharaju ............... B60L 53/65
2026/0107333 A1 * 4/2026 Jiao ....................... H04W 4/021

FOREIGN PATENT DOCUMENTS

CA 3001845 A1 * 11/2018 ................ F16P 3/14
CN 106457540 B * 12/2019 ............. B25F 5/008
DE 202022101816 U1 * 4/2022 ................ B25F 5/00
DE 112022003492 T5 * 5/2024 ......... H01R 43/0427
EP 1455319 A2 * 9/2004 ......... G08B 13/1409
EP 2186064 B1 * 1/2020 ......... G08B 21/0255
GB 2611434 A * 4/2023 ................ B25F 5/00
JP 2001277146 A * 10/2001
KR 101847511 B1 * 4/2018 ............. B25B 21/00
KR 102134713 B1 * 7/2020 ................ B25F 5/00
WO WO-9945498 A1 * 9/1999 ............... G07C 9/28
WO WO-2011115121 A1 * 9/2011 ................ B25F 5/00
WO WO-2013063507 A1 * 5/2013 ............ H04W 4/021
WO WO-2016191215 A1 * 12/2016 ........... G08B 25/016
WO WO-2018050396 A1 * 3/2018 ................ B25F 5/00
WO WO-2018092933 A1 * 5/2018 ............. B25B 21/00
WO WO-2024044541 A1 * 2/2024

* cited by examiner

SYSTEMS AND METHODS FOR TOOL LOCATION TRACKING

RELATED APPLICATIONS

The present application is a national stage entry of International Application No. PCT/US2022/043121, filed on Sep. 9, 2022, which is based on and claims priority from U.S. Patent Application No. 63/242,742, filed on Sep. 10, 2021, the entire disclosure of which is incorporated herein by reference.

SUMMARY

Some embodiments of the disclosure provide a power tool with a motion sensor, a transceiver, and an electronic controller. The electronic controller may include a processor and a memory. The electronic controller may be configured to identify a first location of the power tool based on the power tool exiting a tool tracking area and measure, via the motion sensor, movement of the power tool relative to the first location. Based on the movement measured via the motion sensor, the electronic controller may be configured to transmit power tool location data.

Some embodiments of the disclosure provide a method for location tracking. The method includes identifying a first location of a power tool device based on the power tool device exiting a tool tracking area. The method further includes measuring, with a motion sensor, movement of the power tool device relative to the first location. The method also includes transmitting, via a transceiver, power tool device location data based on the movement measured via the motion sensor.

At least in some embodiments described herein, improved power tools, systems, and methods are provided that may reduce energy consumption to track the power tool and provide an accurate location of the power tool.

BRIEF DESCRIPTION OF THE DRAWINGS

The accompanying drawings, which are incorporated in and form a part of this specification, illustrate embodiments of the disclosure and, together with the description, serve to explain principles of the embodiments.

DETAILED DESCRIPTION

Power tools may be vulnerable to loss due to theft because of their potential high monetary value, portability, and number of individuals at a worksite. Power tools may also be vulnerable to loss from misplacement due to their portability, shared use by multiple workers, and the size and number of tools at a worksite. Accordingly, at worksites and other locations, tracking power tools may be desirable to help prevent or reduce their loss.

In some instances, a power tool may be tracked using an integrated global navigation satellite system (GNSS) receiver that may calculate the power tool location based on data received from multiple GNSS satellites and/or land-based transmitters. However, the utilization of the GNSS leads to high energy consumption that drains a power tool's battery fast and raises the production cost for equipping the GNSS module in the power tool. In other instances, a system may track a power tool that periodically transmits a power tool identifier that is received by a nearby wireless device of the system having a GNSS receiver. The system may, in turn, record the location of the nearby wireless device as a proxy for the power tool. However, the tracking accuracy using this technique may be limited, as the tool may be located anywhere within communication range of the nearby wireless device. In some instances, constellation devices that can communicate with a power tool are distributed in an area to provide increased tracking accuracy within that area (e.g., a tool tracking area). However, when the power tool moves outside of the tool tracking area, the constellation devices may no longer be able to accurately track the power tool location.

Some embodiments described herein provide solutions to these and other problems by providing improved systems, power tools, and methods for efficiently and accurately tracking a location of a power tool. For example, as described herein, motion-based tracking (also referred to as dead reckoning) may be selectively used (e.g., in conjunction with other tracking techniques) to improve tool tracking.

Figure 1:
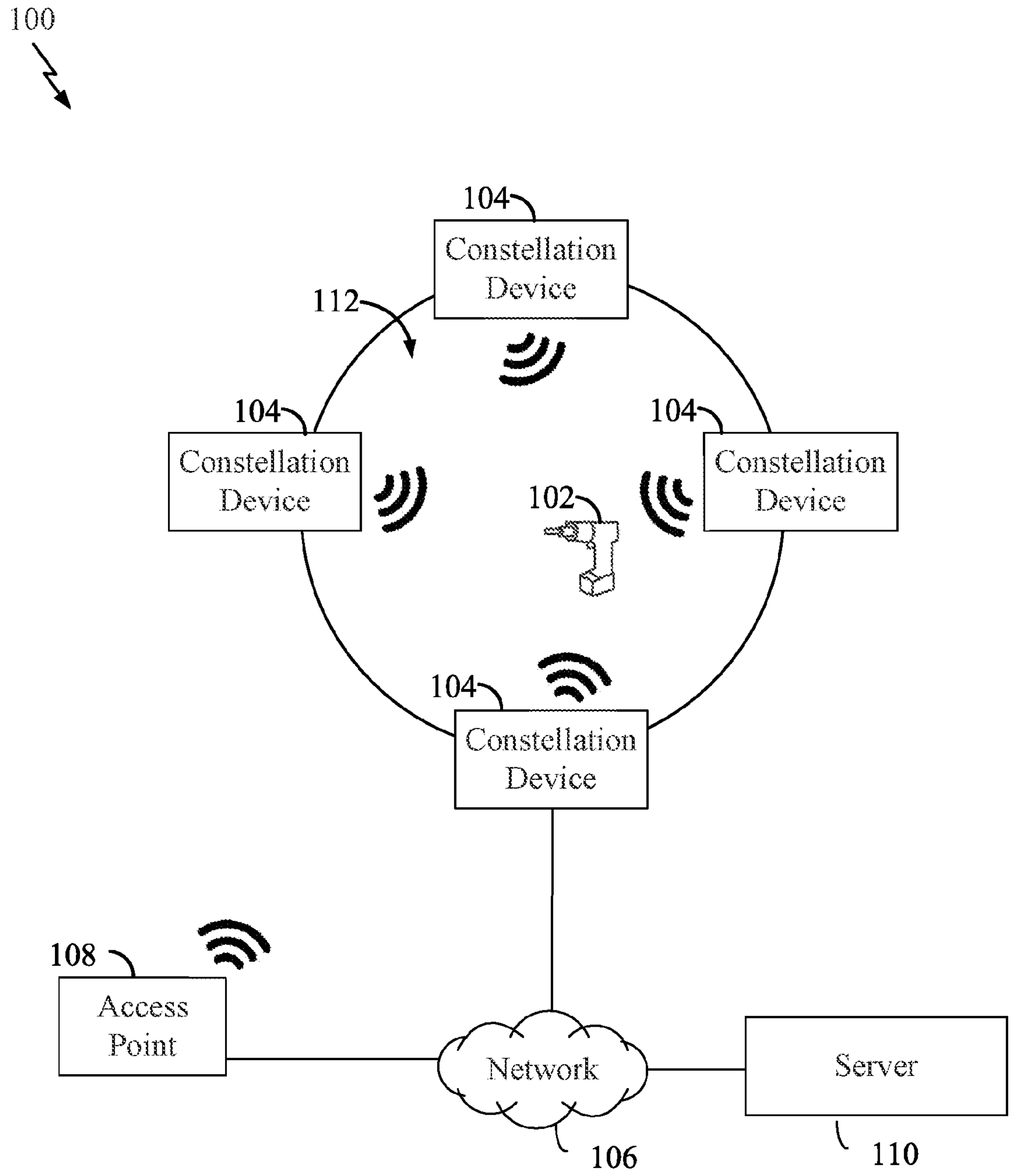
FIG. 1 is a schematic illustration of a tool system according to some embodiments.

FIG. 1 illustrates a tool tracking system 100 according to some embodiments. The tool tracking system 100, also referred to as tracking system 100, includes a power tool device 102, constellation devices 104, a network 106, a server 110, and an access point 108. The tracking system 100 is illustrated and described with respect to a single power tool device 102; however, in some embodiments, the tracking system 100 is used to track additional power tool devices 102.

The power tool device 102 is, for example, a power tool or a power tool battery pack. A power tool may be, for example, a motorized power tool (e.g., an impact driver, a power drill, a hammer drill, a pipe cutter, a sander, a nailer, a reciprocating saw, a circular saw, or a grease gun) or a nonmotorized power tool (e.g., a worksite radio, a worksite light, a ruggedized tracking device, a laser level, a laser distance measurer, battery pack chargers, portable power supplies, etc.). A power tool battery pack is a battery pack configured to power a power tool, as described in further detail below. The power tool device 102 may wirelessly communicate with one or more the constellation devices 104 and/or the access point 108 for tracking a location of the device 102 and/or for communicating with the server 110 via the network 106.

The constellation devices 104 are tracking devices configured to accurately determine a location of the power tool device 102 within a tool tracking area 112. In some examples, one or more of the constellation devices 104 are implemented by instances of other power tool devices. For example, the constellation devices 104 may be a type of power tool device that is typically distributed around a worksite, such as a work light or portable power supply. These types of devices may have semi-fixed locations, often stationary for long periods of times (e.g., hours, days, or weeks). In other examples, the constellation devices 104 may be non-power tool devices with wireless communication capabilities, such as a router or other network device. In still further examples, the constellation devices 104 may be dedicated tracking devices specifically designed for tracking power tools (e.g., the power tool device 102). The constellation devices 104 may communicate the determined location, or information used to determine the location of the power tool device 102, to another device. For example, the constellation devices 104 may communicate the determined location or information to the server 110 via the network 106 and/or to the power tool device 102. The constellation devices 104 may communicate with the server 110 via the network 106 using a wired connection or a wireless connection (e.g., via the access point 108). The constellation devices 104 may communicate with the power tool device 102 via a wireless connection.

The network 106 includes, for example, one or more of a local area network (LAN) (e.g., a Wi-Fi network), a wide area network (WAN) (e.g., a cellular network or the Internet), or another communication network configuration. The network 106 may include one or more network nodes. A network node may include a router, hub, a personal computer, a server, a host, or any other suitable device to provide network resources. The network 106 provides a connection between the server 110 and other devices in the system 100. For example, as noted above, the constellation devices 104 may communicate with the server 110 via the network 106. Similarly, the access point 108 may communicate with the server 110 via the network 106. Additionally, the power tool device 102 may communicate with the server 110 via the access point 108 and/or the constellation device(s) 104 by way of the network 106.

The access point 108 is, for example, a cellular tower, a Wi-Fi router, a mobile device (e.g., a smart phone, a tablet, or laptop), or another wireless communication device. The access point 108 provides wireless access to the network 106 for other components of the system 100, including one or more of the power tool device 102 and/or the constellation devices 104. Accordingly, the power tool device 102 and constellation devices 104 may communicate with the server 110 via the network 106 and a wireless connection to the access point 108. The power tool device 102 and the constellation devices 104 may communicate with the access point 108 wirelessly using one or more of a Bluetooth protocol, Wi-Fi protocol, cellular protocol, or the like.

The server 110 includes, for example, an electronic server processor and a server memory. Although illustrated as a single device, the server 110 may be a distributed device in which the server processor and server memory are distributed among two or more units that are communicatively coupled (e.g., via the network 106). The server 110 may maintain a database for the system (e.g., on the server memory). The server 110 may store tool data in the database for various power tool devices 102 in the system 100, including configuration data for the power tool devices 102 (to configure operational parameters of the devices 102), usage data for the power tool devices 102 (e.g., hours of operation), maintenance data for the power tool devices 102 (e.g. a log of prior maintenance and/or suggestions for future maintenance), operator/owner information for the power tool devices 102, location data for the power tool devices 102 (e.g., for inventory management and tracking), among other data. The server 110 may receive tool data for the power tool device 102 from one or more of the multiple constellation devices 104 and/or from the power tool device 102. For example, the power tool device 102 may periodically or occasionally communicate one or more types of tool data to the server 110 via the access point 108 and/or network 106. Additionally or alternatively, the power tool device 102 may periodically or occasionally communicate one or more types of tool data to the constellation devices 104. The constellation devices 104 may then periodically or occasionally communicate one or more types of tool data to the server 110 via the access point 108 and/or network 106. Additionally or alternatively, the server 110 may request tool data from the power tool devices 102 and/or constellation devices 104 (via the network 106 and/or access point 108), and the constellation devices 104 may request tool data from the power tool devices 102.

The particular numbers, types, and locations of components with the system 100 of FIG. 1 are merely used as an example for discussion purposes; additional and/or different types of power tool devices 102, constellation devices 104, access points 108, networks 106, and servers 110 may be present in some embodiments of the system 100.

Figure 2:
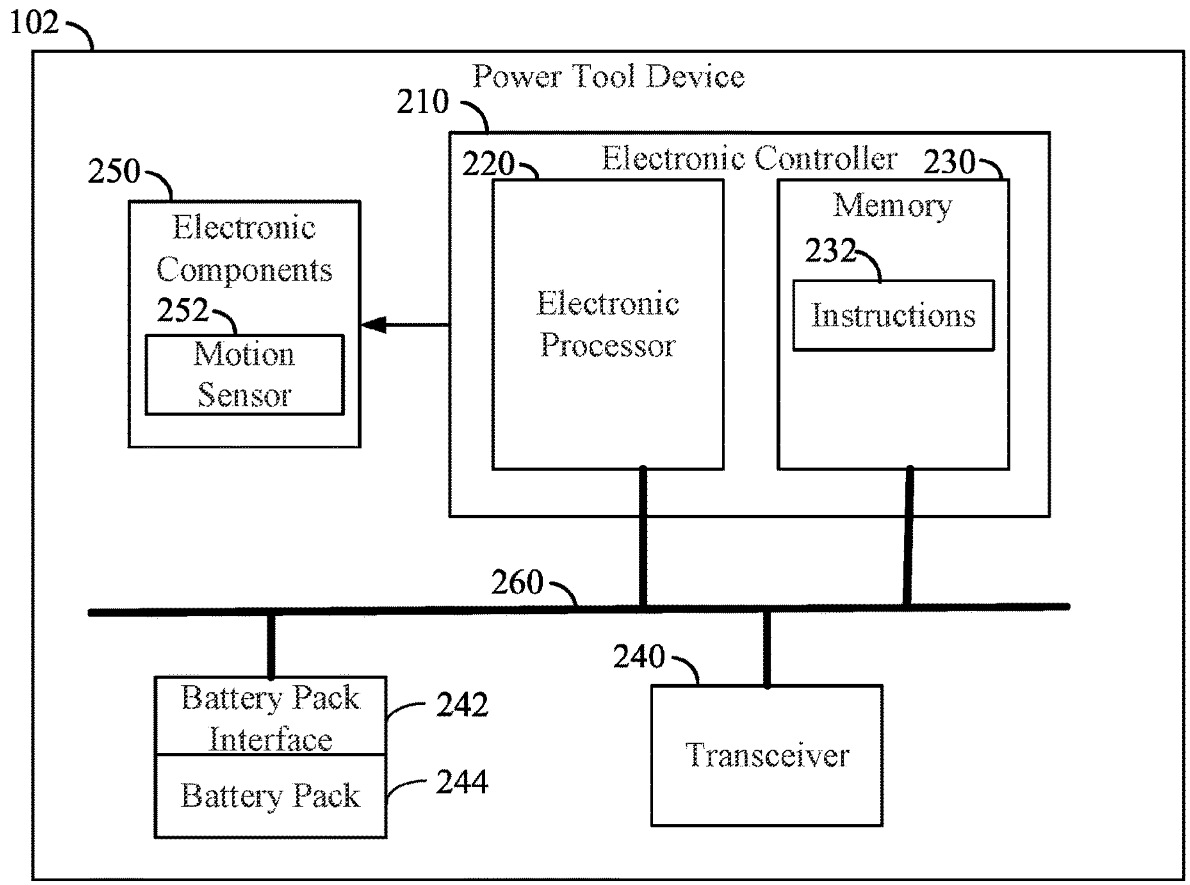
FIG. 2 is a block diagram of a power tool according to some embodiments.

FIG. 2 is a block diagram of an example of a power tool device 102. In some examples, the power tool device 102 may include an electronic controller 210, a transceiver 240, a power tool battery pack 244, and/or electronic components 250. The electronic controller 210 may include an electronic processor 220 and a memory 230. The electronic processor 220, the memory 230, and the transceiver 240 may communicate over one or more control and/or data buses (for example, a device communication bus 260). The memory 230 may include read-only memory (ROM), random access memory (RAM), other non-transitory computer-readable media, or a combination thereof. The memory 230 may include instructions 232 for the electronic processor 220 to execute.

The electronic processor 220 may be configured to communicate with the memory 230 to store data and retrieve stored data. The electronic processor 220 may be configured to receive the instructions 232 and data from the memory 230 and execute, among other things, the instructions 232. In some examples, through execution of the instructions 232 by the electronic processor 220, the electronic controller 210 may perform one or more of the methods described herein. For example, the instructions 232 may include software executable by the electronic processor 220 to enable the electronic controller 210 to, among other things, implement the various functions of the electronic controller 210 described herein, including the functions of the electronic controller 210 described with respect to process 300 of FIG. 3.

The transceiver 240 may be communicatively coupled to the electronic controller 210 (e.g., via the bus 260). The transceiver 240 enables the electronic controller 210 (and, thus, the power tool device 102) to communicate with other devices (e.g., a server 110, an access point 108, a constellation device 104, and/or other power tool devices 102). In some examples, the transceiver 240 further includes a GNSS receiver configured to receive signals from GNSS satellites and/or land-based transmitters, determine a location of the power tool device 102 from the received signals, and provide a location of the power tool device 102 to the electronic controller 210.

In some embodiments, the power tool device 102 may also optionally include a power tool battery pack interface 242 that is configured to selectively receive and interface with a power tool battery pack 244. The pack interface 242 may include one or more power terminals and, in some cases, one or more communication terminals that interface with respective power and/or communication terminals of the power tool battery pack 244. The power tool battery pack 244 may include one or more battery cells of various chemistries, such as lithium-ion (Li-Ion), nickel cadmium (Ni-Cad), and the like. The power tool battery pack 244 may further selectively latch and unlatch (e.g., with a spring-biased latching mechanism) to the power tool device 102 to prevent unintentional detachment. The power tool battery pack 244 may further include a pack electronic controller (pack controller) including a processor and a memory. The pack controller may be configured similarly to the electronic controller 210 of the power tool device 102. The pack controller may be configured to regulate charging and discharging of the battery cells, and/or to communicate with the electronic controller 210. In some embodiments, the power tool battery pack 244 further includes a transceiver, similar to the transceiver 240, coupled to the pack controller via a bus similar to bus 260. Accordingly, the pack controller, and thus the power tool battery pack 244, may be configured to communicate with other devices. Accordingly, in some examples, the power tool battery pack 244 may implement methods described herein as being implemented by the power tool device 102 (e.g., the process 300).

The power tool battery pack 244 is coupled to and configured to power the various components of the power tool device 102, such as the electronic controller 210, the transceiver 240, and the electronic components 250. However, to simplify the illustration, power line connections between the pack 244 and these components are not illustrated.

In some embodiments, the power tool device 102 also includes additional electronic components 250. In some examples, the electronic component 250 may include a motion sensor 252 to detect movement of the power tool device 102. The motion sensor 252 may include an accelerometer to measure the rate of change of velocity over time. The motion sensor 252 may output acceleration data to the electronic controller 210. The acceleration data may include an indication of the measured acceleration experienced by the motion sensor 252 and, thus, by the power tool device 102. In some examples, the acceleration data of the motion sensor 252 may indicate a movement vector indicating a moving distance and a moving direction of the power tool device 102. The movement vector may be indicated directly by the acceleration data or the electronic controller 210 may calculate the movement vector from the acceleration data (e.g., when the output includes acceleration values). Based on the output of the motion sensor 252, the electronic controller 210 may determine and track where the power tool device 102 moves relative to an origin point. In some examples, the motion sensor 252 may also include a gyroscope to minimize the errors of the accelerometer in determining the moving direction of the power tool device 102.

For a motorized power tool (e.g., drill-driver, saw, and the like), the electronic components 250 may include, for example, an inverter bridge, a motor (e.g., brushed or brushless) for driving a tool implement, and the like. For a non-motorized power tool (e.g., a work light, a work radio, ruggedized tracking device, a laser level, a laser distance measurer, battery pack chargers, portable power supplies, and the like), the electronic components 250 may include, for example, one or more of a lighting element (e.g., an LED, a laser, etc.), an audio element (e.g., a speaker), a sensor (e.g., a light sensor, ultrasound sensor, etc.) a power source, charging circuitry, power conversion circuitry, and the like. In some embodiments, the device transceiver 240 may be within a separate housing along with another electronic controller, and that separate housing selectively attaches to the power tool device 102, on an outside surface of the power tool device 102 or by being inserted into a receptacle of the power tool device 102. Accordingly, the wireless communication capabilities of the power tool device 102 may reside in part on a selectively attachable communication device, rather than integrated into the power tool device 102. Such selectively attachable communication devices may include electrical terminals that engage with reciprocal electrical terminals of the power tool device 102 to enable communication between the respective devices and enable the power tool device 102 to provide power to the selectively attachable communication device. In other embodiments, the device transceiver 240 may be integrated into the power tool device 102.

In some examples, the device transceiver 240 may be within a separate housing along with an electronic controller (similar to electronic controller 210), and that separate housing selectively attaches to a non-powered tool (e.g., a wrench, a screwdriver, a ratchet, other hand tools, etc.) or a power tool accessory (e.g., toolboxes or other tool storage containers, personal protective equipment (e.g., work gloves, masks, protective eyewear or glasses, pads, helmets, and protective apparel)). For example, the housing may attach to an outside surface or be inserted into a receptacle of the non-powered tool or power tool accessory. Accordingly, in some examples, the wireless communication capabilities described herein with respect to the power tool device 102 may be provided with a non-powered tool or power tool accessory for tracking thereof.

In some examples in which the power tool device 102 is a power tool battery pack, the battery pack interface 242 and the battery pack 244 of the diagram are replaced with a tool interface (to interface with a battery pack interface of a power tool). In the case of the power tool battery pack implementation, the electronic component 250 can include, for example, one or more battery cells, a charge level fuel gauge, analog front ends, sensors, etc.

Additionally, in some embodiments, the diagram of FIG. 2 also applies to some embodiments of the constellation devices 104. Such embodiments may include a GNSS receiver, as previously described. With the GNSS receiver, the electronic controller of the constellation device 104 may determine a location (e.g., latitude and longitude) of the constellation device 104. In some examples, the constellation devices 104 include the battery pack interface 242 and the battery pack 244. In other examples of the constellation devices 104, the battery pack interface 242 and the battery pack 244 of the diagram are replaced with a power supply (e.g., an AC/DC rectifier, transformer, filter, etc.) and cord to interface with a standard AC wall outlet to power the constellation device 104.

Constellation-Based and Proxy-Based Tracking

Returning to FIG. 1, the tracking system 100 is configured to track the location of the power tool device 102 using the constellation devices 104 with a relatively high degree of accuracy within the tracking area 112. Such tracking may be referred to as constellation-based tracking or constellation tracking. The system 100 may use various tracking techniques to perform the constellation tracking. For example, each constellation device 104 may have a known location. The location of each constellation device 104 may be fixed and stored in the system 100 (e.g., in a memory of the constellation device 104, the server 110, or the power tool device 102) during a setup stage; may be periodically determined (e.g., based on a GNSS receiver integrated into each constellation device 104) and stored in the system 100, or some combination thereof. Further, each of the constellation devices 104 may communicate with the power tool device 102 and, based on a measurement of the communications, triangulate a location of the power tool device 102 within the tracking area 112. Measurements of communications may include, for example, strength of signal measurements, time of flight measurements, or a combination thereof.

More particularly, in some examples, each constellation device 104 may measure a strength of signal of a communication from the power tool device 102, and the strength of signal measurements may correspond to a respective distance between each constellation device 104 and the power tool device 102. For example, in general, the stronger the signal, the closer the power tool device 102 is to a particular constellation device 104. Based on these distances, the system 100 (e.g., one of the constellation devices 104, the power tool device 102, or the server 110) can calculate a location of the power tool device 102 with respect to the known locations of the constellation devices 104 (e.g., using triangulation techniques). In another example, the power tool device 102 may measure a strength of signal of a communication from the constellation devices 104, and the strength of signal measurements may again correspond to a distance between each constellation device 104 and the power tool device 102. Based on these distances, the system 100 (e.g., one of the constellation devices 104, the power tool device 102, or the server 110) can calculate a location of the power tool device 102 with respect to the known locations of the constellation devices 104. In another example, the power tool device 102 or constellation devices 104 may measure a time-of-flight of a communication from the power tool device 102 to each constellation device 104, or from each constellation device 104 to the power tool device 102. Again, the time-of-flight measurement may correspond to a distance between each constellation device 104 and the power tool device 102. For example, in general, the shorter the duration of the time-of-flight, the closer the power tool device 102 is to a particular constellation device. Based on these distances, the system 100 (e.g., one of the constellation devices 104, the power tool device 102, or the server 110) can calculate a location of the power tool device 102 with respect to the known locations of the constellation devices 104 (e.g., using triangulation techniques). The communications between the power tool device 102 and the constellation devices 104 may be unidirectional or bi-directional. In some examples, the communications may be, for example, Bluetooth communications, ultra wide band (UWB) communications, Wi-Fi communications, Zigbee communications, or communications sent according to another protocol.

Regardless of the particular technique used, when the power tool device 102 is outside of the tracking area 112, the accuracy of the location information that the system 100 can produce via the constellation tracking diminishes. For example, as the power tool device 102 travels outside of the tracking area 112 in a particular direction (e.g., to the left of the tracking area 112), the power tool device 102 may become out of communication range with one or more constellation devices at an opposite side of the tracking area 112 (e.g., on the right side of the tracking area 112). Because the power tool device 102 is able to communicate with fewer constellation devices 104, the system 100 may lose its ability to obtain measurements on communications with sufficient constellation devices 104 to accurately triangulate the location of the power tool device 102.

Accordingly, outside of the tracking area 112, the system 100 may not be able to track the location of the power tool device 102 or may use another tracking technique having reduced accuracy relative to the constellation tracking. For example, in some embodiments, the system 100 uses proxy-based location tracking for the power tool device 102 when the power tool device 102 is outside of the tracking area 112. In proxy-based tracking, the system 100 may use a known location of a wireless communication device in the system 100 (e.g., the access point 108 or one of the constellation devices 104) as a proxy for the power tool device 102 in response to the power tool device 102 communicating with the wireless communication device. For example, the power tool device 102 may periodically beacon (i.e., transmit or broadcast) a power tool identifier using a short range communication (e.g., a Bluetooth communication or Zigbee communication) that is received by the wireless communication device. In response, the wireless communication device may transmit a message to the server 110 (via the network 106) with the power tool identifier and the current location of the wireless communication device. The wireless communication device may determine its current location using a GNSS receiver of the wireless communication device (e.g., when the wireless communication device is an access point 108 or constellation device 104 that is mobile, such as a mobile phone). In some examples, the wireless communication device may determine its current location from a memory of the wireless communication device (e.g., when the wireless communication device is an access point 108 or constellation device 104 that is fixed, such as some work lights or routers). For example, when the wireless communication device is fixed at a location, the wireless communication device may store its location in a memory during a setup operation. In some examples, when the server 110 previously received and stored a fixed location of the wireless communication device, the wireless communication device may transmit a message to the server 110 (via the network 106) with the power tool identifier and an identifier for the wireless communication device. The server 110 may then determine the current location by accessing the memory of the server 110 using the identifier for the wireless communication device.

Accordingly, the tracking area 112 represents an area in which a power tool device 102 can be tracked using a first location tracking technique (e.g., triangulation via the constellation devices 104) that is more accurate than a second tracking technique (e.g., the proxy-based tracking technique). Although the tracking area 112 is illustrated as a circle passing through the constellation devices 104, the tracking area 112 may have different shapes and sizes dependent on the communication range of the constellation devices 104 and the power tool device 102 and the location of the constellation devices 104.

In some embodiments of the tracking system 100, a motion-based tracking technique is enabled and implemented by the tracking system 100 to track the power tool device 102 outside of the tracking area 112. The motion-based tracking technique may also be referred to as a dead reckoning-based tracking technique. The motion-based tracking technique may provide improved tracking accuracy for the power tool device 102 relative to the proxy-based tracking and constellation tracking (e.g., when outside of the tracking area 112). Further, the motion-based tracking technique may use less power than other tracking techniques, such as techniques that rely on a GNSS receiver integrated into or attached to a power tool device.

Figure 3:
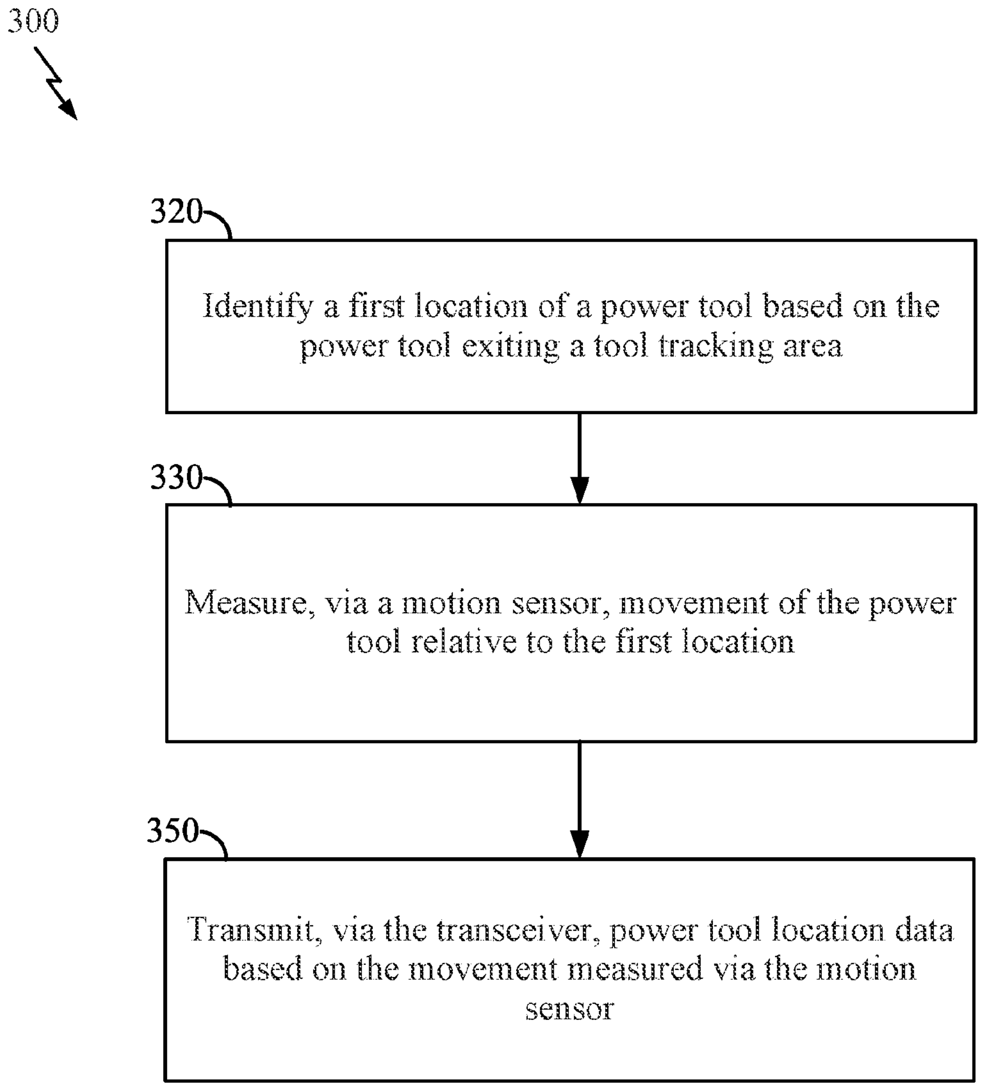
FIG. 3 is a flowchart of a process for tracking a location of a power tool according to some embodiments.
Figure 4:
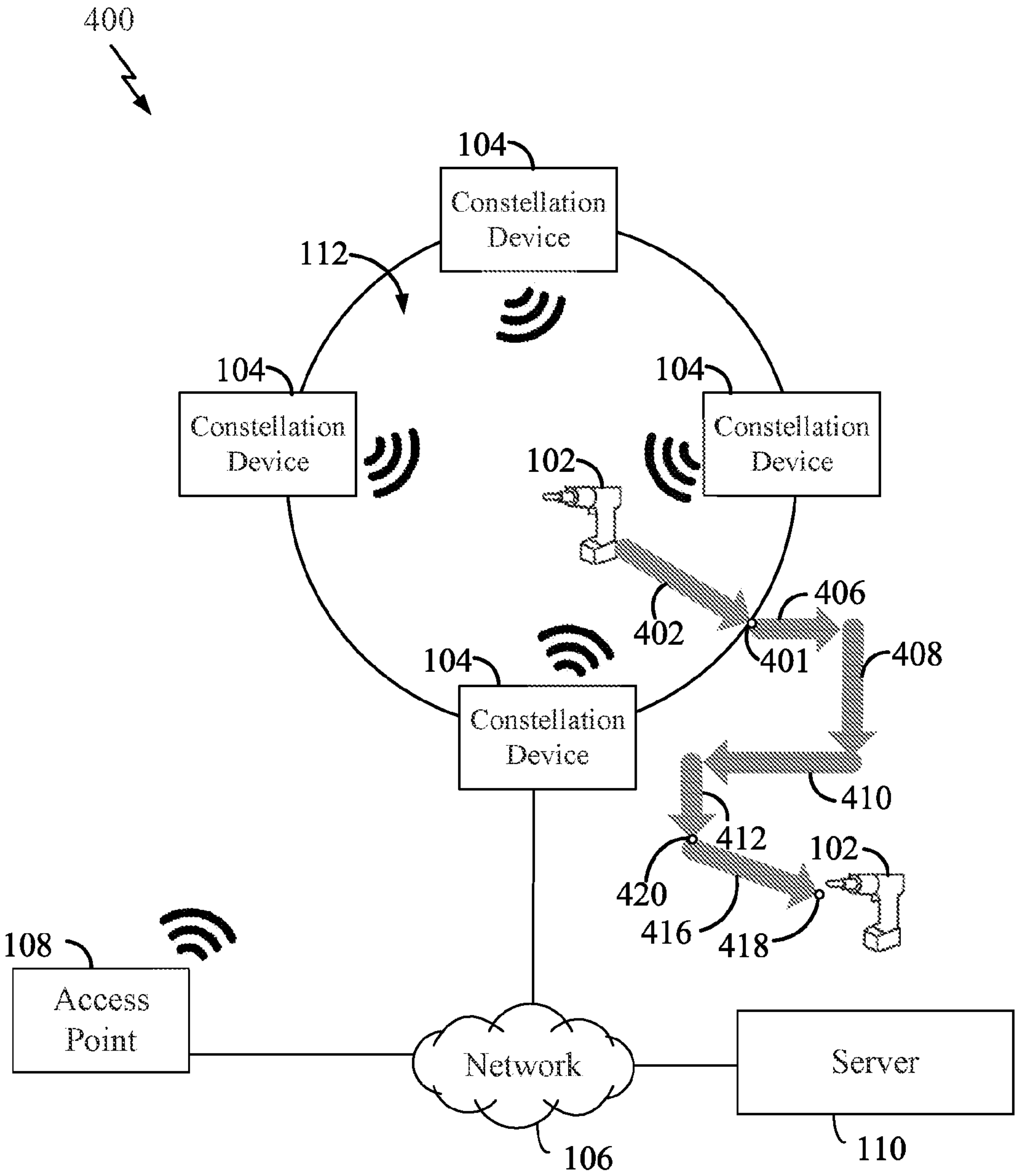
FIG. 4 is a schematic illustration of a location tracking system according to some embodiment.

FIG. 3 illustrates a process 300 for motion-based location tracking of a power tool device 102. FIG. 4 is a schematic illustration to facilitate an explanation of the process 300. The process 300 is described below as being carried out by the power tool device 102 of the system 100 as illustrated in FIGS. 1 and 2. For example, the blocks of the process 300 below are described as being executed by the electronic controller 210 of the power tool device 102. However, in some embodiments, the process 300 is implemented by another device and/or in another system having additional, fewer, and/or alternative components. Additionally, although the blocks of the process 300 are illustrated in a particular order, in some embodiments, one or more of the blocks may be executed partially or entirely in parallel, may be executed in a different order than illustrated in FIG. 3, or may be bypassed.

In block 320, the electronic controller 210 identifies a first location of the power tool device 102 based on the power tool device 102 exiting the tool tracking area 112. The first location is, for example, an exit point indicating where the power tool device 102 exited the tool tracking area 112 and/or indicating when constellation tracking based on the constellation devices 104 ceased. For example, FIG. 4 illustrates a first location 401 indicative of where the power tool device 102, which was traveling along path 402, exited the tool tracking area 112 and ceased being tracked via constellation tracking. In some examples, the tool tracking area 112 defines or represents an area in which another tracking technique is used other than constellation tracking (e.g., GNSS-based tracking or proxy-based location tracking).

The first location 401 may indicate an absolute (or geographic) location. For example, the absolute location may be defined as a latitude and longitude or other geographic coordinates indicating a particular physical position on Earth. In other examples, the first location 401 may indicate a relative location in a virtual map or space. For example, the first location 401 may be an origin point in a virtual map (e.g., (0, 0) in a two-dimensional space, or (0, 0, 0) in a three-dimensional space). In another example, the virtual map may have another origin (e.g., a center point of the multiple constellation devices 104), and the first location 401 is defined by coordinates relative to that origin.

In some examples, the electronic controller 210 identifies the first location 401 by receiving the first location from the multiple constellation devices 104 or the server 110. For example, the multiple constellation devices 104 or the server 110 may detect the power tool device 102 exiting the tool tracking area 112 and transmit the location (e.g., the first location) of the power tool device 102 to the power tool device 102. For example, a boundary defining the tracking area 112 may be defined in advance. Then, when the system 100 detects that the power tool device 102 has reached the boundary using constellation tracking, as described above, the constellation devices 104 or access point 108 may transmit the current location of the power tool device 102 to the power tool device 102. The power tool device 102, in turn, may use that current location as the first location 401. As another example, the constellation devices 104 may detect that the power tool device 102 is exiting the tool tracking area 112 based on determining that a signal strength of a communication to or from the power tool device 102 has dropped below a low-strength threshold, or that a time-of-flight of the communication has exceeded a long-flight threshold. In response, the constellation devices 104 may transmit the current location of the power tool device 102 to the power tool device 102. The power tool device 102, in turn, may use that current location as the first location 401.

In other examples, the power tool device 102 may identify the first location 401 from a memory of the power tool device 102 (e.g., the memory 230). For example, the power tool device 102 may regularly receive and store the location of the power tool device 102 as determined by the system 100 via constellation tracking from one or more of the constellation devices 104 or the access point 108. Then, when the power tool device 102 exits the tool tracking area, the electronic controller 210 recognizes the most recent (or last known) location of the power tool as the first location 401. The electronic controller 210 may determine that the power tool device 102 is exiting the tracking area 112 based on one or more of (1) comparing the most recently received power tool location to a known boundary of the tracking area 112, (2) determining that a signal strength of a communication to or from one or more of the constellation devices 104 has dropped below a low-strength threshold, or that a time-of-flight of the communication(s) has exceeded a long-flight threshold, or (3) receiving an indication of exiting transmitted wirelessly from another component of the system 100 (e.g., one or more of the constellation devices 104 or the server 110 (via the access point 108). In the case of receiving the indication of exiting from another component of the system 100, as described above, the system 100 may determine that the power tool is exiting the tracking area 112 using constellation tracking or based on analyzing strength-of-signal or time-of-flight measurements of communications with the constellation devices 104, as described above.

In some examples, the electronic controller 210 identifies the first location 401 as an origin point on a virtual map. For example, the electronic controller 210 may identify the first location 401 as origin point (0,0) on a two-dimensional (2D) virtual map, or point (0,0,0) on a three-dimensional (3D) virtual map (e.g., maintained by the electronic controller 210). The electronic controller 210 may store the origin point as the first location 401 to the memory 230.

In block 330, the electronic controller 210 measures, via a motion sensor 252, movement of the power tool device 102 relative to the first location. For example, the motion sensor 252 may output acceleration data to the electronic controller 210. The acceleration data may include an indication of the measured acceleration experienced by the motion sensor 252 and, thus, by the power tool device 102. In some examples, the acceleration data of the motion sensor 252 may indicate a movement vector indicating a moving distance and a moving direction of the power tool device 102. The movement vector may be indicated directly by the acceleration data or the electronic controller 210 may calculate the movement vector from the acceleration data (e.g., when the acceleration data includes time-series acceleration values). In the example of time-series acceleration values, the electronic controller 210 may convert or calculate distance and direction (a movement vector) for discrete time intervals based on the acceleration value. For example, if the acceleration data indicates that the power tool device 102 started at rest, and then moved with constant acceleration at 0.5 meters per second squared (m/s$^2$) in a positive direction along an x-axis for 2 seconds, the electronic controller 210 may compute the movement vector to be +0.5 meters in the x direction, where $$\text{distance} = (\text{initial velocity} \times \text{time}) + \frac{1}{2}(\text{acceleration} \times \text{time})^2.$$

Accordingly, based on the acceleration data from the motion sensor 252, the electronic controller 210 may determine one or more movement vectors of the power tool device 102, each movement vector associated with a particular period of time.

In some examples, the movement of the power tool device 102 measured in block 330 may include or be expressed as one or more movement vectors. As noted, each movement vector may include a moving distance and a moving direction. For example, with reference to FIG. 4, the electronic controller 210 may identify the first location 401 where the power tool device 102 exits the tool tracking area 112. After identifying the first location 404, for example, the power tool device 102 moves 1 meter to the east along path 406, 2 meters to the south along path 408, 2 meters to the west along path 410, 1 meters to the south along path 412, and 2 meters to the southeast along path 416. The electronic controller 210 may measure, via the motion sensor 252, this movement as a series of movement vectors. For example, the electronic controller 210 may further generate five movement vectors based on the acceleration data from the motion sensor 252 as shown in Table 1:

TABLE 1

| Index | Direction | Distance | Travel Distance |
|---|---|---|---|
| 1 | East | 1 meter | 1 meter |
| 2 | South | 2 meters | 3 meters |
| 3 | West | 2 meters | 5 meters |
| 4 | South | 1 meter | 6 meters |
| 5 | Southeast | 2 meters | 8 meters |

As illustrated in FIG. 4 and expressed in Table 1, the electronic controller 210 may generate or determine a separate movement vector in response to a change in direction of the power tool device 102. In some examples, each movement vector may be generated based on a predetermined period of time (e.g., 0.1 seconds, 0.5 seconds, 1 second, 2 seconds, etc.). For example, the movement of the power tool device 102 along path 406 (1 meter east) may have occurred over 1 second, and the electronic controller 210 may generate or determine a movement in 0.1 second increments. In such examples, the electronic controller 210 may express the movement along path 406 as ten movement vectors, where each movement vector indicates 0.1 meters in an eastward direction. The electronic controller 210 may store these movement vectors individually and/or may consolidate or sum movement vectors in the same direction and store them, for example, as indicated in Table 1. Further, although Table 1 illustrates five movement vectors, electronic controller 210 may consolidate or sum these movement vectors into fewer movement vectors or just one movement vector. Accordingly, the measured movement of the power tool device 102 (as moved in FIG. 4) may be represented by a single movement vector.

As noted, in block 330, the electronic controller 210 may determine or define the movement of the power tool 102 as one or more movement vectors. In some examples, in block 330, the electronic controller 210 further determines or defines the movement of the power tool device 102 as including a travel distance. The travel distance includes a sum of the moving distances of the one or more movement vectors making up the movement of the power tool device 102. For example, with reference to Table 1, when the movement of the power tool device 102 includes the five movement vectors indexed 1-5, the travel distance is 8 meters.

In block 350, the electronic controller 210 transmits, via the transceiver 240, power tool location data based on the movement measured via the motion sensor 252. For example, the electronic controller 210 wirelessly transmits the power tool location data to one or more of the constellation devices 104 and/or the server 110 (e.g., via the access point 108 and/or the network 106).

In some examples, the power tool location data indicates the movement of the power tool device 102 that the electronic controller 210 measured via the motion sensor 252. For example, the power tool location data may include the one or more movement vectors and/or travel distance. In some examples, the power tool location data further includes the first location 401 of the power tool device 102. In other examples, the first location 401 may already be known within the system 100 (e.g., by the constellation devices 104 and/or the server) and, thus, the electronic controller 210 does not transmit the first location 401. Regardless, in instances where the electronic controller 210 transmits the measured movement of the power tool as the power tool location data, a receiving device in the tracking system 100 (e.g., the server 110 or one of the constellation devices 104) may then use the measured movement to calculate a current location (e.g., a second location 418) of the power tool device 102. For example, the receiving device may calculate the current location of the power tool device 102 by determining an overall motion vector from the measured movement (e.g., by summing the one or more movement vectors) and adding the overall motion vector to coordinates of the first location 401.

In some examples, the power tool location data includes a raw or semi-processed version of the acceleration data output by the motion sensor 252 and received by the electronic controller 210. As noted, such acceleration data may include time-series acceleration values that may be used to calculate one or more movement vectors of the power tool device 102. Additionally, as noted above, the power tool location data may also include the first location 401 as part of the power tool location data, or the first location 401 may already be known within the system 100. Accordingly, the receiving device (i.e., the device receiving the power tool location data transmitted by the electronic controller 210) may, in turn, calculate the one or more movement vectors and then calculate the current location of the power tool device 102 based on the first location 401 and the one or more movement vectors (e.g., according to techniques described above).

In some examples, the power tool location data may include the second location 418 of the power tool device 102 calculated by the electronic controller 210 and indicative of a current location of the power tool device 102. For example, the electronic controller 210 may determine an overall motion vector from the measured movement (e.g., by summing the one or more movement vectors) and add the overall motion vector to coordinates of the first location 401. The resulting location represents or is indicative of the second location 418 (i.e., the current location of the power tool device 102. The second location 418 may be expressed similar to the first location 401. For example, the second location 418 may be an absolute location (e.g., defined by latitude and longitude) or a relative location (e.g., defined as coordinates in a virtual map maintained by the electronic controller 210). For example, if the first location 401 is an origin point (0,0) in a 2D virtual map with north-south directions on the y-axis and east-west directions on the x-axis, where each coordinate unit represents 1 meter (e.g., coordinates (1, 1) means 1 meter east and 1 meter north of the origin point)), the second location 418 may be expressed as coordinates $(-1+\sqrt{2}, -3-\sqrt{2})$ based on the values in Table 1. Accordingly, the electronic controller 210 may, in some examples, transmit the current location of the power tool device 102 as the power tool location data.

In some examples, the electronic controller 210 may be triggered to transmit, via the transceiver 240, the power tool location data in block 350 in one or more ways. For example, the electronic controller 210 may transmit the power tool location data in block 350 a predetermined amount of time after identifying the first location of the power tool in block 320, after exiting the tracking area 112, after ceasing of constellation tracking, and/or after measuring of movement of the power tool begins in block 330. As a further example, the electronic controller 210 may transmit the power tool location data in block 350 in response to determining that the power tool device 102 has travelled above a threshold amount or is a distance from the first location above a threshold amount. As a further example, the electronic controller 210 may transmit the power tool location data in block 350 in response to the power tool device 102 staying in place for a predetermined amount of time, or in response to a request from another device in the system (e.g., the server 110, one of the constellation devices 104, or the access point 108) or in response to a request from a user via an input device on the power tool device 102 (e.g., a button actuation).

After transmitting the power tool location data in block 350, the electronic controller 210 may return to block 330 to measure further movement of the power tool relative to the first location. For example, the electronic controller 210 may obtain or determine further acceleration data and/or one or more movement vectors, as described above. The electronic controller 210 may then proceed again to block 350 to transmit further power tool location data based on the further movement measured via the motion sensor. The transmission may be triggered based on an elapse of a predetermined amount of time (e.g., since the previous transmission or another event), based on a traveled distance (e.g., since the last transmission or relative to the first location 401), based on a distance from another point (e.g., the first location or a previously transmitted location) being above a threshold amount, or based on another one of the above-described triggers. Accordingly, the electronic controller 210 may continue to loop through blocks 330 and 350 to continuously provide location data for the power tool device 102 (periodically or aperiodically, depending on the transmission trigger). Thus, the tool tracking system 100 is configured to continue to track the location of the power tool device 102 despite the power tool device 102 exiting the tracking area 112. More particularly, the tool tracking system 100 is configured to track the location of the power tool device 102 using motion-based tracking when the power tool device 102 is outside of the tracking area 112.

In some examples of the process 300, the electronic controller 210 may turn on the motion sensor 252 based on the power tool device 102 exiting the tool tracking area 112 and/or the constellation devices ceasing constellation tracking of the power tool device 102. For example, in conjunction with block 320 or between blocks 320 and 330, the electronic controller 210 may enable (e.g., turn on) the motion sensor 252. To enable the motion sensor 252, the electronic controller 210 may control a switch to close (or open) to connect the motion sensor 252 to a power source or may directly supply power to the motion sensor 252. Once enabled, the electronic controller 210 may measure movement of the power tool device 102 using the motion sensor 252 and, thereby, execute block 330 of the process 300. By having the motion sensor 252 disabled while the system 100 tracks the power tool using constellation tracking (e.g., when in the tracking area 112), the power tool device 102 uses less power, and the location of the power tool device 102 may still be known. By using less power, the battery life or runtime of the power tool battery pack 244 may be extended.

In other examples, the electronic controller 210 does not selectively turn on and off the motion sensor 252. Rather, for example, the motion sensor 252 is enabled while the power tool device 102 is in the tracking area 112 and the system 100 performs constellation tracking. For example, power tool devices 102 that rely on or use a motion sensor, such as the motion sensor 252, for other purposes (e.g., detecting kickback, tool drop, etc.) may generally have the motion sensor powered-on whenever the power tool device 102 may be in operation. In such examples, the motion sensor 252 may be referred to as a dual-purpose motion sensor, where the motion sensor 252 is used both for motion-based tracking and at least one other purpose (e.g., detecting kickback, tool drop, etc.).

In some examples of the process 300, the electronic controller 210 may determine whether the travel distance from the first location 404 exceeds a predetermined threshold. For example, when the electronic controller 210 loops through blocks 330 and 350 to continuously provide location data for the power tool device 102, after each transmission in block 350, the electronic controller 210 may determine whether the travel distance exceeds the predetermined threshold. In response to determining that the travel distance from the first location 404 exceeds the predetermined threshold, the electronic controller 210 may cease transmission of the power tool location data and the motion-based tracking. For example, with reference to Table 1 above and FIG. 4, the particular predetermined threshold may be 6 meters. In this example, the electronic controller 210 may determine that travel distance of the power tool device 102 exceeded the predetermined threshold at point 420 in FIG. 4 (e.g., after movement vector with index 4).

The particular threshold of 6 meters is used merely for illustration and discussion purposes. The particular threshold may vary by implementation. For example, the predetermined threshold (e.g., a travel threshold) may be selected based on an expected accuracy degradation that may occur using motion-based tracking over a certain time or distance. That is, a measurement error may be associated with the motion sensor 252 and the acceleration data output by the motion sensor 252. Because, in the motion-based tracking, the tool location may be determined based on an accumulation of measurements (acceleration data) over time, as the quantity of measurements or distance traveled increases, the total measurement error may also increase. In other words, the measurement error relative to the first location accumulates over time as the power tool travels. Accordingly, a travel threshold may be selected for use by the electronic controller 210 to determine when the accumulated potential measurement error exceeds a desired accuracy for the motion-based tracking. In some examples, the electronic controller 210 determines whether the travel distance from the first location 404 exceeds the predetermined threshold by comparing a calculated travel distance (that the electronic controller 210 calculates based on measured movement of the power tool device 102) to the travel threshold. In some examples, the electronic controller 210 determines whether the travel distance from the first location 404 exceeds the predetermined threshold by receiving an indication of such from the server 110, access point 108, and/or constellation device(s) 104. The server 110, access point 108, and/or constellation device(s) 104 may make such a determination based on analysis of the power tool location data received from the power tool device 102 and comparison if the distance travelled by the power tool device 102 to the travel threshold.

As noted, once the travel threshold is exceeded, the electronic controller 210 may cease transmission of the power tool location data and the motion-based tracking. In some examples, in addition to ceasing motion-based tracking (or as an alternative to ceasing motion-based tracking), the system 100 initiates another tool tracking technique. For example, the system 100 may initiate proxy-based tracking, as described above. For example, the electronic controller 210 may begin broadcasting an identifier that is received by one or more of the access point 108 or the constellation device(s) 104.

In some embodiments of the process 300, the electronic controller 210 determines that the power tool device 102 has re-entered the tracking area 112. The electronic controller 210 may determine that the power tool device 102 has re-entered the tracking area 112 based on measurements of communications between the power tool device 102 and one or more of the constellation devices 104 (e.g., strength-of-signal and/or time-of-flight measurements), or based on an indication received from one or more of the constellation devices 104. In response to determining that the power tool device 102 has re-entered the tracking area 112, the electronic controller 210 may cease transmission of the power tool location data and the motion-based tracking, and the system 100 may restart constellation tracking (as described above).

Although the process 300 is described with respect to one power tool device 102, in some embodiments, the system 100 may include a plurality of power tool devices 102. In such embodiments, each power tool device 102 may be tracked using the process 300 (e.g., an electronic controller of each power tool may execute the process 300). Additionally or alternatively, in some embodiments, the system 100 may include one or more non-powered tools and/or one or more power tool accessories, each fitted with a wireless communication device (e.g., as described above and including a transceiver 240, electronic controller 210, and power source such as a coin cell). In such embodiments, each power tool device, non-powered tool, and power tool accessory may be tracked using the process 300 (e.g., an electronic controller of each device, tool, or accessory may execute the process 300).

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including." "comprising." or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top." "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

In some embodiments, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.). Also, functions performed by multiple components may be consolidated and performed by a single component. Similarly, the functions described herein as being performed by one component may be performed by multiple components in a distributed manner. Additionally, a component described as performing particular functionality may also perform additional functionality not described herein. For example, a device or structure that is "configured" in a certain way is configured in at least that way, but may also be configured in ways that are not listed.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component." "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

As used herein, unless otherwise defined or limited, the phase "and/or" used with two or more items is intended to cover the items individually and the items together. For example, a device having "a and/or b" is intended to cover: a device having a (but not b); a device having b (but not a); and a device having both a and b.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The following detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Various features and advantages of the disclosure are set forth in the following claims.

The invention claimed is:

1. A power tool device for location tracking, comprising:
- a motion sensor configured to sense motion;
- a transceiver configured to wireless communicate; and
- an electronic controller including a processor and a memory, the electronic controller communicatively coupled to the motion sensor and the transceiver, and the electronic controller configured to:
  - identify a first location of the power tool device based on the power tool device exiting a tool tracking area, wherein the tool tracking area is defined by a plurality of constellation devices configured to track the power tool device; activate the motion sensor based on the power tool device exiting the tool tracking area;
  - measure, via the motion sensor, movement of the power tool device relative to the first location; and
  - transmit, via the transceiver, power tool device location data based on the movement measured via the motion sensor.

2. The power tool device of claim 1, wherein the electronic controller is further configured to:
- calculate a second location of the power tool device based on the movement measured via the motion sensor and the first location, and
- wherein the power tool device location data includes the second location.

3. The power tool device of claim 2, wherein the movement of the power tool device measured via the motion sensor includes one or more movement vectors, each movement vector including a moving distance and a moving direction, and
- wherein, to calculate the second location based on the movement and the first location, the electronic controller is configured to:
- add the one or more movement vectors to the first location.

4. The power tool device of claim 1, wherein the electronic controller is further configured to:
- determine a travel distance from the first location based on motion data from the motion sensor; and
- in response to determining that the travel distance exceeds a predetermined threshold; cease transmission of the power tool device location data, and
- broadcast an identifier to an access point for use in location tracking.

5. The power tool device of claim 1, wherein the motion sensor comprises an accelerometer.

6. The power tool device of claim 1, wherein the plurality of constellation devices are configured to restart tracking of the power tool device based on the power tool device reentering the tool tracking area.

7. The power tool device of claim 1, wherein the power tool device is a power tool comprising a motor for driving a tool implement and a power tool device battery interface for receiving a power tool device battery pack, or a power tool battery pack configured to power a power tool.

8. The power tool device of claim 1, wherein the power tool device location data includes at least one selected from a group of a geographic location indicative of the movement of the power tool device relative to the first location, a relative location indicative of the movement of the power tool device relative to the first location, one or more motion vectors indicative of the movement measured via the motion sensor, and a travel distance indicated by the movement measured via the motion sensor.

9. A method for location tracking, comprising:

identifying, by a controller, a first location of a power tool device based on the power tool device exiting a tool tracking area, wherein the tool tracking area is defined by a plurality of constellation devices configured to track the power tool device; activating a motion sensor based on the power tool device exiting the tool tracking area; measuring, by the controller with the motion sensor;

movement of the power tool device relative to the first location; and transmitting, by the controller via a transceiver, power tool device location data based on the movement measured via the motion sensor.

10. The method of claim 9, further comprising:

calculating a second location of the power tool device based on the movement measured via the motion sensor and the first location, and wherein the power tool device location data includes the second location.

11. The method of claim 10, wherein the movement of the power tool device measured via the motion sensor includes one or more movement vectors, each movement vector including a moving distance and a moving direction, and wherein the method further comprises: to calculate the second location based on the movement and the first location, adding the one or more movement vectors to the first location.

12. The method of claim 9, further comprising:

determining a travel distance from the first location based on motion data from the motion sensor; and in response to determining that the travel distance exceeds a predetermined threshold, ceasing transmission of the power tool device location data; and broadcasting an identifier to an access point for use in location tracking.

13. The method of claim 9, wherein the motion sensor comprises an accelerometer.

14. The method of claim 9, further comprising:

restarting constellation tracking of the power tool device, by the plurality of constellation devices, based on the power tool device reentering the tool tracking area.

15. The method of claim 9, wherein the power tool device is a power tool comprising a motor for driving a tool implement and a power tool device battery interface for receiving a power tool device battery pack, or a power tool battery pack configured to power a power tool.

16. The method of claim 9, wherein the power tool device location data includes at least one selected from a group of a geographic location indicative of the movement of the power tool device relative to the first location, a relative location indicative of the movement of the power tool device relative to the first location, one or more motion vectors indicative of the movement measured via the motion sensor, and a travel distance indicated by the movement measured via the motion sensor.

17. The power tool device of claim 1, wherein the electronic controller determines that the power tool device is exiting the tool tracking area based on an indication from at least one of the plurality of constellation devices, wherein the indication is based on the at least one of the plurality of constellation devices determining that a signal strength of communication to or from the power tool device dropped below a low-strength threshold.

18. The power tool device of claim 1, wherein the electronic controller receives a current location of the power tool device transmitted from at least one of the plurality of constellation devices.

19. A power tool device for location tracking, comprising:

a motion sensor configured to sense motion;

a transceiver configured to wireless communicate; and an electronic controller including a processor and a memory, the electronic controller communicatively coupled to the motion sensor and the transceiver, and the electronic controller configured to:

identify a first location of the power tool device based on the power tool device exiting a tool tracking area, the tool tracking area is defined by a plurality of constellation devices configured to track the power tool device;

activate the motion sensor based on the power tool device exiting the tool tracking area; measure, via the motion sensor, movement of the power tool device relative to the first location;

transmit, via the transceiver, power tool device location data based on the movement measured via the motion sensor;

determine a travel distance from the first location based on motion data from the motion sensor; and in response to determining that the travel distance exceeds a predetermined threshold:

cease transmission of the power tool device location data; and broadcast an identifier to an access point for use in location tracking.

* * * * *